J. BURNS.
JOINT STRUCTURE FOR METALLIC FURNITURE.
APPLICATION FILED AUG. 14, 1916.
1,258,532.
Patented Mar. 5, 1918.
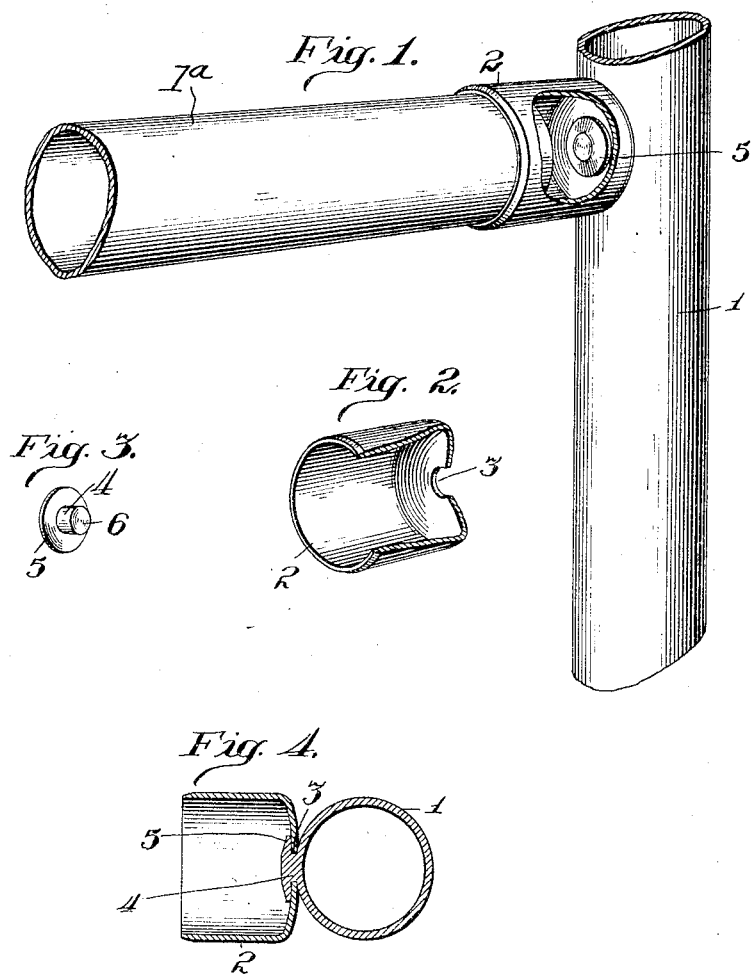
Inventor.
John Burns

UNITED STATES PATENT OFFICE.

JOHN BURNS, OF KENOSHA, WISCONSIN.

JOINT STRUCTURE FOR METALLIC FURNITURE.

1,258,532.   Specification of Letters Patent.   Patented Mar. 5, 1918.

Application filed August 14, 1916. Serial No. 114,635.

*To all whom it may concern:*

Be it known that I, JOHN BURNS, a citizen of the United States, residing at 701 Park avenue, in the city of Kenosha, county of Kenosha, and State of Wisconsin, do hereby declare that I am the first, original, and sole inventor of a new and useful Improvement in Joint Structures for Metallic Furniture, of which the following is a specification.

My invention relates to a joint structure for metallic furniture, such as bedsteads, for rigidly securing together companion frame members, the axes of which intersect each other at an angle.

The object of the invention is to provide a strong rigid and inexpensive connection between the parts which will present a neat appearance and will avoid mutilation of the exposed surfaces in the vicinity of the joint.

A further object of the invention is to permit of the rigid uniting of two members composed of different materials which could not be directly electrically welded to each other, or if when electrically welded would be of low mechanical strength.

One exemplification of my invention is illustrated in the accompanying drawings, wherein, Figure 1 is a perspective view of a portion of a metallic bedstead with parts broken away.

Fig. 2 is a broken out perspective view of one of the parts illustrated in Fig. 1.

Fig. 3 is a perspective view of the rivet or connecting member, and

Fig. 4 is a sectional view taken transversely through the joint shown in Fig. 1.

In the accompanying drawings, 1 indicates a metallic tubular corner post, or upright, of a metallic bedstead and 1ª one of the cross rails, or tubes, which is here shown as a metallic tubular member of substantially the same character as the post 1, but it will be understood that the member 1ª may be different in character from the member 1, that is, it may be of a different metal, or it may be solid, as for instance in the form of a wooden bar and it may be of any desired cross sectional shape.

2 designates a ferrule of substantially cup-shape providing a socket for receiving one end of the member 1ª and having a closed end designed to abut against the surface of the member 1 and provided axially with an opening 3, which receives the shank 4 of the metallic rivet illustrated in Fig. 3. This rivet is provided with a head 5, providing a marginal portion designed to overlie and contact with the inner surface of the closed end of the ferrule 2 about the wall of the opening 3 therein and the end 6 of the shank of the rivet is intended to be welded to the contiguous portion of the post 1.

In effecting the weld any well-known or improved apparatus may be employed. In this operation the post 1 preferably is used as one electrode and the companion electrode is brought in contact with the outer surface of the head 5 of the rivet, and during the time the welding current is on considerable pressure is applied to the electrode to insure a good contact with the head of the rivet, a good contact between the end 6 of the shank and the post 1 and for forcing the aforesaid marginal surface of the head 5 into firm engagement with the inner surface of the closed end of the ferrule. Thus after the weld is completed the ferrule will be securely clamped between the head of the rivet and the surface of the post 1 and a rigid connection formed between the latter and the shank of the rivet.

In effecting this weld there is no liability of the exposed surfaces of the post 1, ferrule 2 or cross rail 1ª being marred, or in anywise mutilated, and this is of considerable importance in joining the parts after they have been given a finish.

As is obvious the material out of which the cross rail 1ª is made is of no importance, since its ends are simply supported in the socket provided by the ferrule 2 and it is likewise of no importance that the ferrule may not be of the same material as the post 1, or of a material which could not be electrically welded thereto.

The described joint structure is particularly desirable in the manufacture of metallic, or part-metallic, bedsteads, for the reason that the joint secured is particularly neat in appearance, is of the desired strength, and may be inexpensively made.

I claim—

The combination with a tubular member and a sheet metal ferrule, or cup-shaped member, having an axial opening through the closed end thereof of a headed rivet having its shank extending through said opening and electrically welded at its end to the first named member, the head of said rivet being located within the cup-shaped member and interlocking with the end thereof about the axial opening therein, and a third member disposed at an angle to said tubular member and having its end supported in the socket provided by the cup-shaped member.

JOHN BURNS.

Copies of this patent may be obtained for five cents each, by addressing the "Commissioner of Patents, Washington, D. C."